United States Patent
Robinson (10) Patent No.: US 8,300,089 B2
(45) Date of Patent: Oct. 30, 2012

(54) STEREOSCOPIC DEPTH MAPPING (75) Inventor: Michael G. Robinson, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 475 days.

(21) Appl. No.: 12/541,902

(22) Filed: Aug. 14, 2009

(65) Prior Publication Data
US 2010/0039502 A1 Feb. 18, 2010

Related U.S. Application Data (60) Provisional application No. 61/089,018, filed on Aug. 14, 2008, provisional application No. 61/102,493, filed on Oct. 3, 2008.

(51) Int. Cl.
*H04N 13/02* (2006.01)

(52) U.S. Cl. ............... 348/47; 348/43; 348/44

(58) Field of Classification Search ............ 348/42, 348/47, 43, 44
See application file for complete search history.

(56) References Cited

U.S. PATENT DOCUMENTS

| | | | |
|---|---|---|---|
| 4,028,934 A * | 6/1977 | Sollish | 73/620 |
| 4,557,570 A * | 12/1985 | Hines | 396/325 |
| 5,175,616 A * | 12/1992 | Milgram et al. | 348/47 |
| 5,548,362 A * | 8/1996 | Wah Lo et al. | 396/326 |
| 5,664,163 A * | 9/1997 | Yutaka et al. | 345/522 |
| 5,801,760 A | 9/1998 | Uomor | |
| 6,043,838 A * | 3/2000 | Chen | 348/42 |
| 6,175,973 B1 | 1/2001 | Uomori et al. | |
| 6,324,347 B1 | 11/2001 | Bacs, Jr. et al. | |
| 6,326,995 B1 | 12/2001 | Palm et al. | |
| 6,512,892 B1 * | 1/2003 | Montgomery et al. | 396/326 |
| 6,798,406 B1 | 9/2004 | Jones et al. | |
| 6,831,677 B2 * | 12/2004 | Peleg et al. | 348/36 |
| 6,963,661 B1 * | 11/2005 | Hattori et al. | 382/154 |
| 7,557,824 B2 | 7/2009 | Holliman | |
| 7,938,540 B2 * | 5/2011 | Brentnall et al. | 353/7 |
| 8,085,293 B2 * | 12/2011 | Brodsky et al. | 348/49 |
| 2002/0118275 A1 | 8/2002 | Harman | |
| 2003/0164841 A1 * | 9/2003 | Myers | 345/619 |
| 2004/0136571 A1 | 7/2004 | Hewitson et al. | |
| 2004/0207641 A1 | 10/2004 | Palm et al. | |
| 2005/0089212 A1 * | 4/2005 | Mashitani et al. | 382/154 |
| 2005/0117215 A1 | 6/2005 | Lange | |
| 2005/0190180 A1 | 9/2005 | Jin et al. | |
| 2006/0039529 A1 | 2/2006 | Tsubaki et al. | |

(Continued)

FOREIGN PATENT DOCUMENTS
GB 2351216 A 12/2000

OTHER PUBLICATIONS

Notification of transmittal of the international search report and the written opinion of the international searching authority, international search report and written opinion for corresponding PCT application No. PCT/US09/59596 to Applicant Real D.

(Continued)

*Primary Examiner* — Michael Won
(74) *Attorney, Agent, or Firm* — Baker & McKenzie LLP (57) ABSTRACT

Provided is a method and apparatus for linear depth mapping. Linear depth mapping includes using algorithms to correct the distorted depth mapping of stereoscopic capture and display systems.

34 Claims, 9 Drawing Sheets

U.S. PATENT DOCUMENTS

2006/0152579 A1 7/2006 Utsugi et al.
2006/0203085 A1 9/2006 Tomita
2007/0075997 A1 4/2007 Rohaly et al.
2007/0247522 A1 10/2007 Holliman
2008/0226160 A1 9/2008 Birtwistle et al.

OTHER PUBLICATIONS

International search report and written opinion in corresponding PCT application No. PCT/US2010/028182.

Wheatstone, C., "On Some Remarkable, and Hitherto Unobserved Phenomena of Binocular Vision (Part the First)", Phil. Trans. Roy. Soc. Lon. pp. 371-394 (1838).

Lipton, L., "Foundations of the Stereoscopic Cinema", Van Nostrand Reinhold (1982).

Berretty, R-P. M. et al., "Real Time Rendering for Multiview Autostereoscopic Displays," Proc. of SPIE and IS&T Electronic Imaging, SPIE vol. 6055, 6055N (2006).

International Search Report and Written Opinion for PCT?US2009/053954 mailed Oct. 9, 2009.

International preliminary report on patentability from PCT/US10/28182 mailed Sep. 27, 2011.

Notification of Transmittal of International Preliminary Report on Patentability, International Preliminary Report on Patentability from PCT/US09/53954 mailed May 1, 2012.

Supplementary Partial European Patent search report patent application No. 09818628 dated May 15, 2012.

Williams, et al, "New computational control techniques and increased understanding for stereo 3-D displays", Proceedings of SPEI, vol. 1256, pp. 73-82, XP000565512, ISSN: 0277-0786X (Jan. 1, 1990).

European Patent search report patent application No. 09807398 dated Dec. 16, 2011.

Supplementary European Search Report from co-pending European application No. 10756671 dated Jul. 3, 2012.

Lipton, "Stereographics: Developers' Handbook",Stereographics Developers Handbook, XX, XX, pp. 42-49, XP002239311 (Jan. 1, 1997).

* cited by examiner

STEREOSCOPIC DEPTH MAPPING

CROSS-REFERENCE TO RELATED APPLICATIONS

This application relates and claims priority to commonly-assigned U.S. Provisional Patent Application No. 61/089,018, filed Aug. 14, 2008, entitled "Linear Stereoscopic Depth Mapping," and 61/102,493 filed Oct. 3, 2008, entitled "Optimal depth mapping," both of which are incorporated herein by reference for all purposes.

TECHNICAL FIELD

This disclosure relates generally to stereoscopic three-dimensional (3D) imagery and, more specifically, to depth mapping for stereoscopic images.

BACKGROUND

Stereoscopic capture and viewing has been commonplace since Charles Wheatstone invented the Stereoscope in 1833 as discussed in *On Some Remarkable, and Hitherto Unobserved Phenomena of Binocular Vision (Part the First)*, Wheatstone, Charles, Phil. Trans. Roy. Soc. Lon. pp. 371-394 (1838). Similar to the present day ViewMaster®, this Victorian device uses two still camera images which are seen independently by a viewer's eyes. The spatial separation or disparity between similar objects within the images gives the sensation of depth.

Capture of stereoscopic content is achieved with two cameras whose fixed spacing is chosen to match a depth budget associated with a playback display device. This generally results in perceived depth being both compressed and distorted producing 'cardboard cut-outs' and flat 'wall-paper' backgrounds.

BRIEF SUMMARY

Methods and apparatuses disclosed in the present application include using algorithms to substantially correct the distorted depth mapping of stereoscopic capture and display systems.

According to an aspect, a method is provided for positioning cameras for capturing a stereoscopic image of a scene comprising a left image and a right image. The method includes determining a minimum separation between the left image and the right image for a nearest object in the stereoscopic image. The method also includes determining a maximum separation between the left image and the right image for a most distant object in the stereoscopic image. The method also includes calculating a camera separation based on the minimum separation and the maximum separation.

Other features and aspects will be apparent with reference to the detailed description, the drawings, and the claims.

DETAILED DESCRIPTION

When two cameras of fixed separation capture a stereoscopic image pair from a real scene, the depth on a playback stereo display is non-linear. Uniformly-spaced objects (such as telegraph poles disappearing into the distance) appear to get closer together the further away they are. As used herein, the term "camera" refers to either a physical camera or a capture viewpoint in Computer Generated Imagery (CGI) virtual space. The present disclosure may relate to both a real-world capture environment and a CGI environment.

Figure 1A:
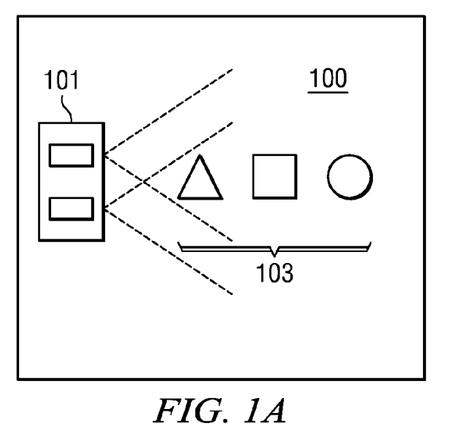
FIGS. 1A and 1B are schematic diagrams illustrating a top view of a scene and a top view of objects as visualized on a display illustrating non-linear depth mapping, in accordance with the present disclosure.
Figure 1B:
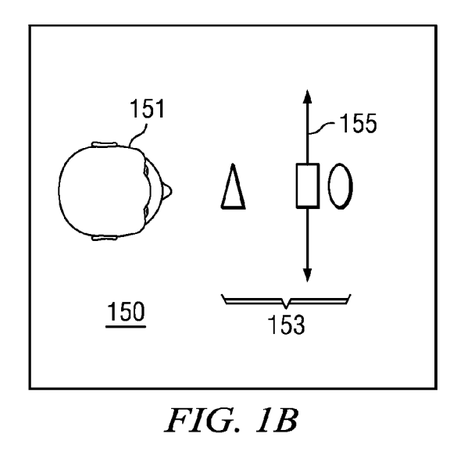

FIGS. 1A and 1B are schematic diagrams illustrating this depth distortion phenomenon. FIG. 1A illustrates the top view of a scene 100 with stereoscopic cameras 101 and substantially equally-spaced objects 103. FIG. 1B illustrates the top of the same scene as visualized on a display 150. Viewer 151 faces a display with a display plane 155, and perceives the objects 153 at a non-uniform depth.

Figure 2:
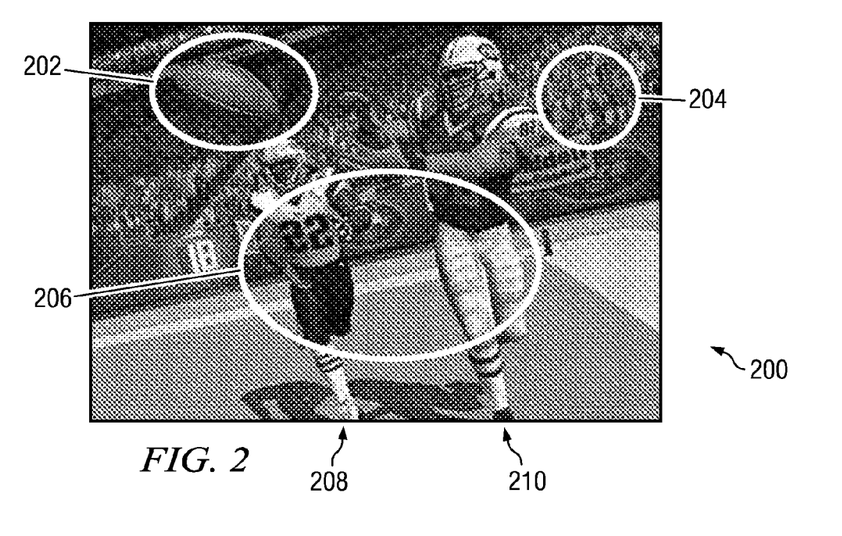
FIG. 2 is a schematic diagram illustrating the effect of non-linear depth mapping on a 3D image, in accordance with the present disclosure.

FIG. 2 is a schematic diagram illustrating a 3-D scene 200 and the effect of non-linear depth mapping. The ball 202 is in the foreground of the scene 200 and appears too close (and thus, appears distorted). The depth between the players 208 and 210, who appear in the middle ground of the scene 200, is relatively good. The crowd 204 in the background appears flat and appears similar to a painted backdrop or wallpaper.

The geometries of the camera capture and display playback systems and the relation between actual and perceived depth and have been analyzed by many individuals, see, e.g., Lipton, Lenny, *Foundations of the Stereoscopic Cinema*, Van Nostrand Reinhold (1982), which is herein incorporated by reference for all purposes. Mathematical analysis reveals a general difficulty to provide scaled-depth on finite sized displays as large disparities on physically small screens typically cause viewer discomfort. Scaled-depth is defined herein as when perceived depth is directly proportional to actual depth causing objects to appear at the appropriate depth for their position and size. Others have proposed correcting for this distorted depth by introducing variable camera separation for discrete depth regions within the scene, see, e.g., U.S. Pat. No. 7,557,824 to Holliman, which is herein incorporated by reference for all purposes. This approach is applicable within the context of computer graphical (CG) generation of content and is routinely used in Hollywood content generation for scene enhancement, as discussed by Rob Engle in *Beowulf 3D: A Case Study*, Proc. of SPIE-IS&T Electronic Imaging, SPIE Vol. 6083, 68030R, which is herein incorporated by reference for all purposes. To date, these approaches typically use artistic decisions to determine where perceived depth should be emphasized. In an embodiment, an algorithm disclosed in the present application is one that determines depth allocation automatically, making it highly suitable to automated environments such as those employed in computer games. A mathematical analysis of the relationship between the capture and replay display geometries is provided below.

Mathematical Framework

Figure 3:
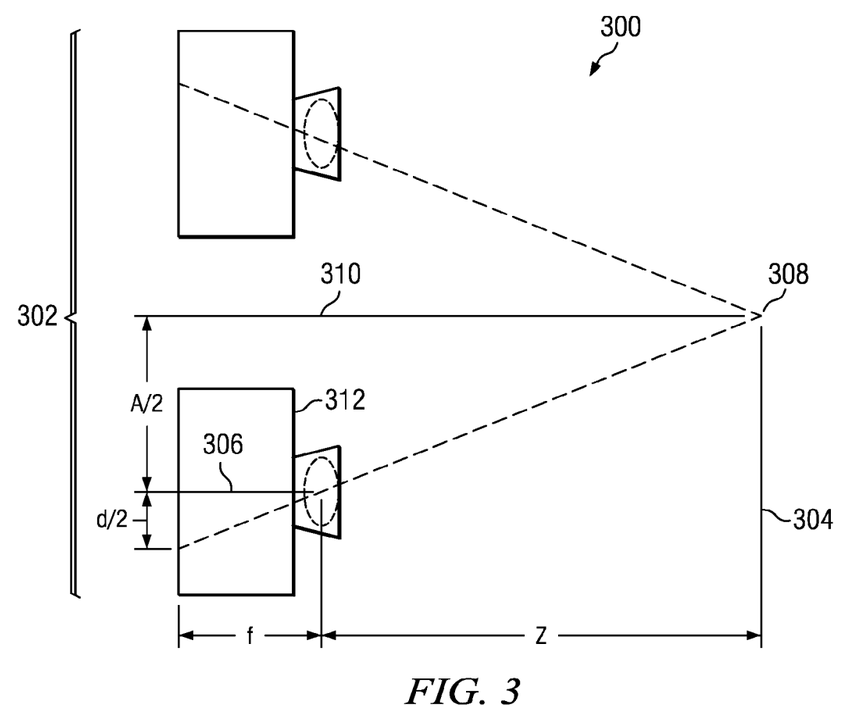
FIG. 3 is a schematic diagram illustrating stereo capture geometry, in accordance with the present disclosure.

FIG. 3 shows a top-down view of a symmetrical capture set-up 300 with parallel cameras 302, i.e. cameras with parallel optical axes and symmetrical around a line 310 running through the object 308 and perpendicular to the object plane 304. Line 306 runs along the optical axis of camera 312 and through a central sensor (or the central portion of the sensor) of camera 312 (and is perpendicular to the object plane 304). A symmetrical capture set-up 300 is used to avoid vertical disparity from keystone distortion that is present with non-parallel optical axes. The distance Z from the cameras 302 to the plane of the object 304 is related to d/2 and A/2 by:

$$\frac{d}{f} = \frac{A}{Z} \quad \text{(Equation 1)}$$

where f is the focal length of the camera 302, d/2 is the distance from line 306 (or the distance from the central sensor), and A/2 is the distance from line 310 to line 306.

Figure 4:
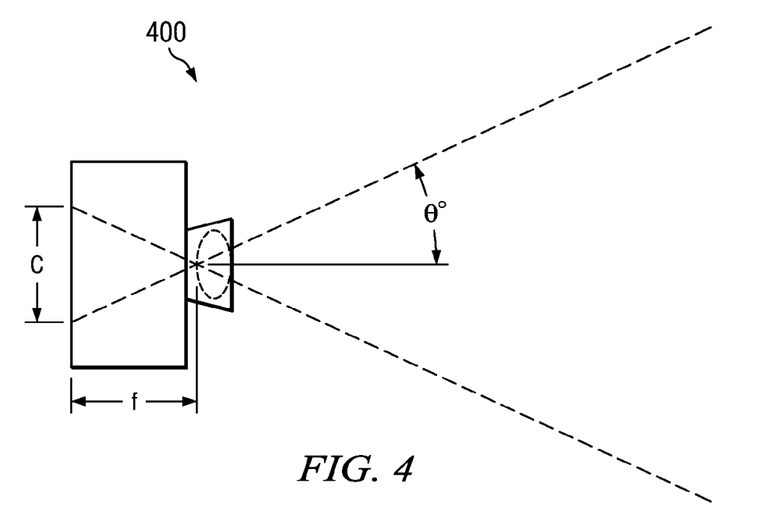
FIG. 4 is a schematic diagram illustrating camera parameters, in accordance with the present disclosure.

FIG. 4 is a schematic diagram of a top-down view of a camera 400. The focal length f of the camera 400 is further related to the half-angle capture θ of the camera 400 and its sensor size c by the geometry of FIG. 4, where:

$$c = 2f \tan\theta \quad \text{(Equation 2)}.$$

Figure 5:
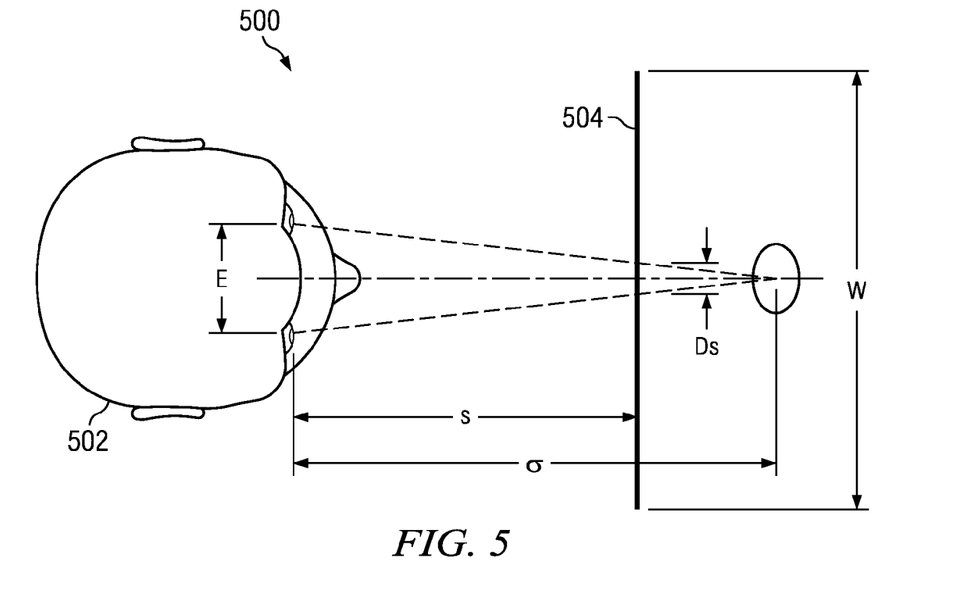
FIG. 5 is a schematic diagram illustrating the viewing geometry of disparity on the screen to perceived depth, in accordance with the present disclosure.

FIG. 5 is a schematic diagram of a top-down view of replay geometry 500. A viewer 502 with eye separation E looks at a screen 504 onto which the stereoscopic imagery captured in FIG. 3 is replayed. The distance of the screen s, the eye separation E, and the screen disparity Ds, determine the perceived depth σ, through the relation:

$$\sigma = \frac{E \cdot s}{(E - Ds)}. \quad \text{(Equation 3)}$$

The disparity Ds of any one point on the screen from an object originally captured at a distance Z is related to the scaled camera sensor disparity d and a fixed disparity (or offset) D as follows:

$$Ds = D - \frac{W}{c}d. \quad \text{(Equation 4)}$$

D is the fixed disparity or offset between a left and right image pairs in units of the screen. An image pair may be shifted by a fixed disparity D after capture. Alternatively, the camera sensors may be moved relative to the lenses. D is introduced to set the zero parallax or screen depth position by shifting and cropping of the captured images.

Combining Equations 1-4 yields the following expression relating perceived depth σ with actual depth Z:

$$\sigma = \frac{s \cdot E \cdot Z}{\left(E \cdot Z - D \cdot Z + \frac{A \cdot Z}{2\tan\theta}\right)}. \quad \text{(Equation 5)}$$

This is the general form of the mapping equation relating actual depth Z to perceived depth σ for a given capture-replay system.

Suitable values for A and D are those that fit the mapped depth within the limits or disparity budget of the display. All displays have a disparity budget where image separation does not exceed a maximum $Ds_{max}$ or a minimum amount $Ds_{min}$.

Figure 6:
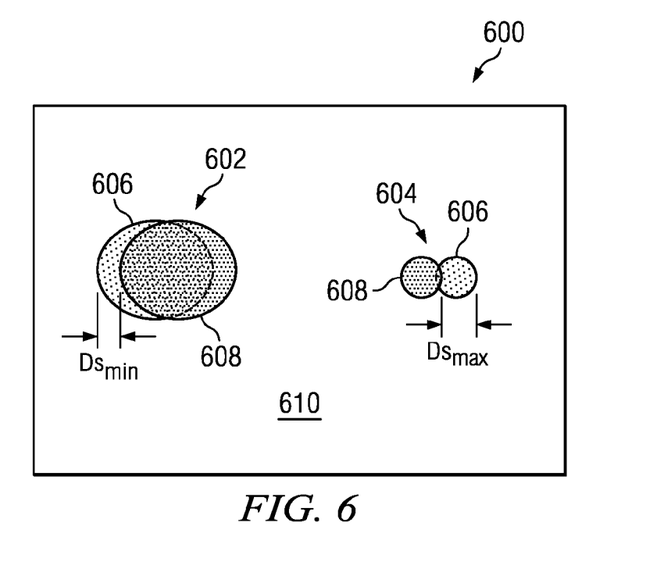
FIG. 6 is a schematic diagram illustrating the disparity limits for a display screen, in accordance with the present disclosure.

FIG. 6 is a schematic diagram illustrating a disparity budget for a 3D image 600 displayed on a display screen 610. The left eye 608 and right eye 606 views for the nearest object 602 and the farthest object 604 are shown in the scene 600. The nearest object 602 defines the minimal image separation $Ds_{min}$ between the left eye 608 and the right eye 606 for the scene 600. The farthest object 604 defines the maximum image separation $Ds_{max}$ between the left eye 608 and the right eye 606 for the scene 600. The disparity budget depends on screen size, position of objects on the screen (e.g., central positioning is more forgiving than side positioning), and the personal characteristics of the viewer (some people can endure more than others). However, applying maximum and minimum conservative limits to any given display should ensure a good stereoscopic viewing experience.

Once a disparity budget is determined, a fixed camera separation A and fixed disparity D can be determined mathematically. Using Equations 1-4, the following expressions are derived for the minimum ($Ds_{min}$) and maximum ($Ds_{max}$) on-screen disparities, which correspond to the greatest separation of near and far objects respectively:

$$Ds_{min} = D - \frac{W \cdot A}{2Z_{min} \tan\theta} \quad \text{(Equation 6)}$$

and $$Ds_{max} = D - \frac{W \cdot A}{2Z_{max} \tan\theta}. \quad \text{(Equation 7)}$$

Subtracting these two expressions and solving for the camera separation A yields the following expression for a preferred fixed separation camera set up to accommodate a desired disparity budget:

$$A = \frac{2 \cdot \tan\theta \cdot Z_{max} \cdot Z_{min} \cdot (Ds_{max} - Ds_{min})}{W \cdot (Z_{max} - Z_{min})} \quad \text{(Equation 8)}$$

which when substituted into Equation 5 yields the following expression for the fixed disparity setting:

$$D = \frac{(Z_{max} \cdot Ds_{max} - Z_{min} \cdot Ds_{min})}{(Z_{max} - Z_{min})}. \quad \text{(Equation 9)}$$

Using the general expression given by Equation 5, it is possible to graph the non-linear mapping between actual distance Z and perceived distance σ for an example scene similar to that of FIG. 2. Assuming the players in the foreground of the scene are ≈5 m from the camera (i.e. $Z_{min}$=5000 mm) and the background crowd ≈50 m ($Z_{max}$=50000 mm). We can assume a typical playback 1000 mm wide (=W) display will be viewed at a typical s=2 m distance with comfortable disparity limits, i.e. $Ds_{max}$=30 mm and $Ds_{min}$=−20. Scenes of this nature are often captured with θ=15° zoomed cameras. Substituting these parameters into Equations 8 and 9 generates values for A and D of ≈150 and ≈36 mm respectively.

Figure 7:
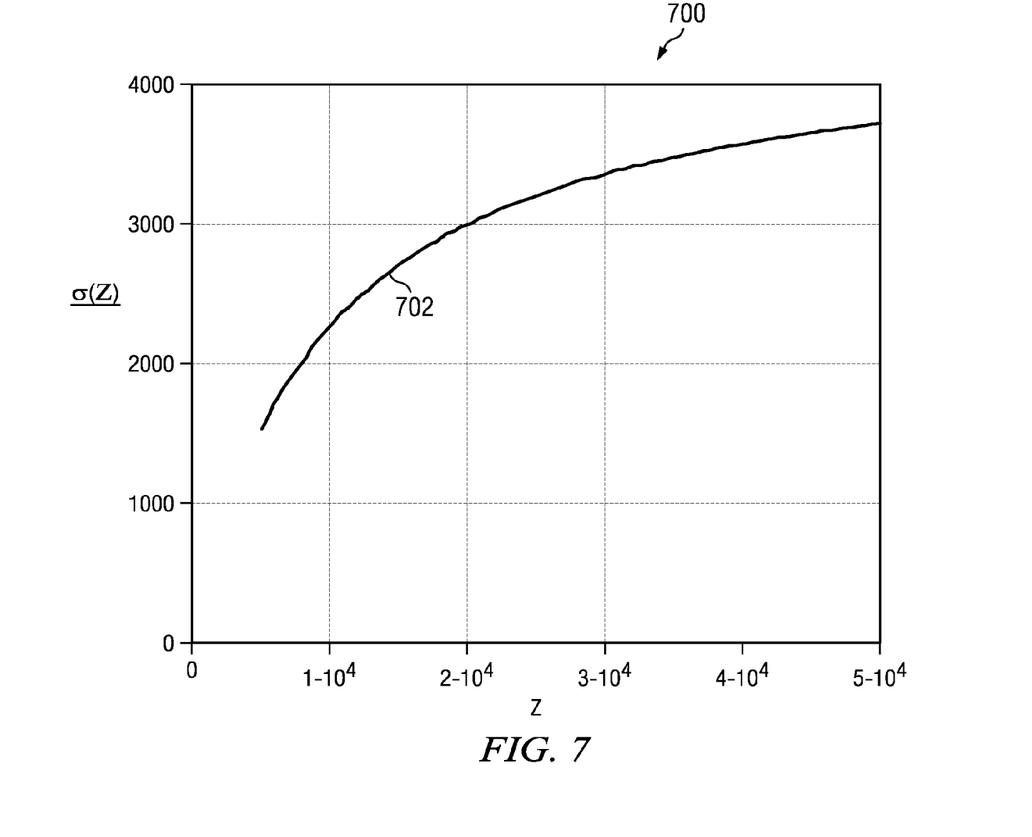
FIG. 7 is a graph illustrating the non-linear mapping relationship between actual depth Z and perceived depth $\sigma$ for stereoscopic capture and replay, in accordance with the present disclosure.

FIG. 7 is a graph 700 illustrating the non-linear mapping relationship 702 between the perceived depth σ of objects that were Z obtained by further substitution of the numbers above into Equation 5. Graph 700 shows the non-linear 702 depth mapping and the apparent flattening of distant objects.

Scaled-Depth

In an embodiment, it is preferred that the perceived depth σ is directly proportional to the actual depth Z (perceived depth σ directly proportional to the actual depth Z is referred to herein as scaled-depth) as this preserves both the relative depth spacing of objects and relates correctly the size of objects to their perceived depth. This substantially avoids conflict between depth cues since real world objects form images on a viewer's retina whose size is similarly directly proportional to their actual distance from the viewer. The following mathematical derivation elaborates on these relationships.

Figure 8:
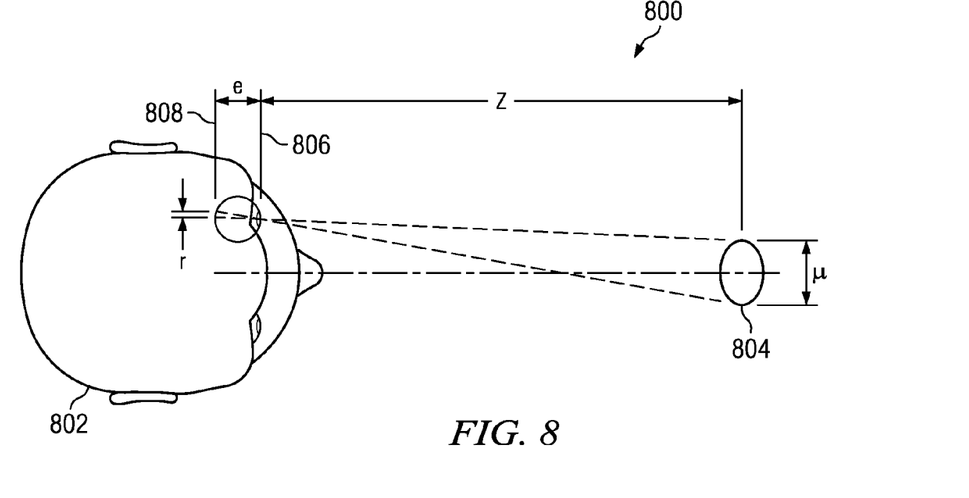
FIG. 8 is a schematic diagram illustrating the relative size of an object viewed naturally to a human retina; in accordance with the present disclosure.

FIG. 8 is a schematic diagram illustrating the relation between size and depth of a natural scene 800. A viewer 802 perceives an object 804 from a distance (or at a depth) Z. The distance from the front of the eye 804 to the retina 808 is defined as e. The object 804 has a height μ. The size of the object on the retina r is related to the size of the object μ by the following geometrical relation:

$$r = \frac{e}{Z}\mu. \quad \text{(Equation 10)}$$

Figure 9:
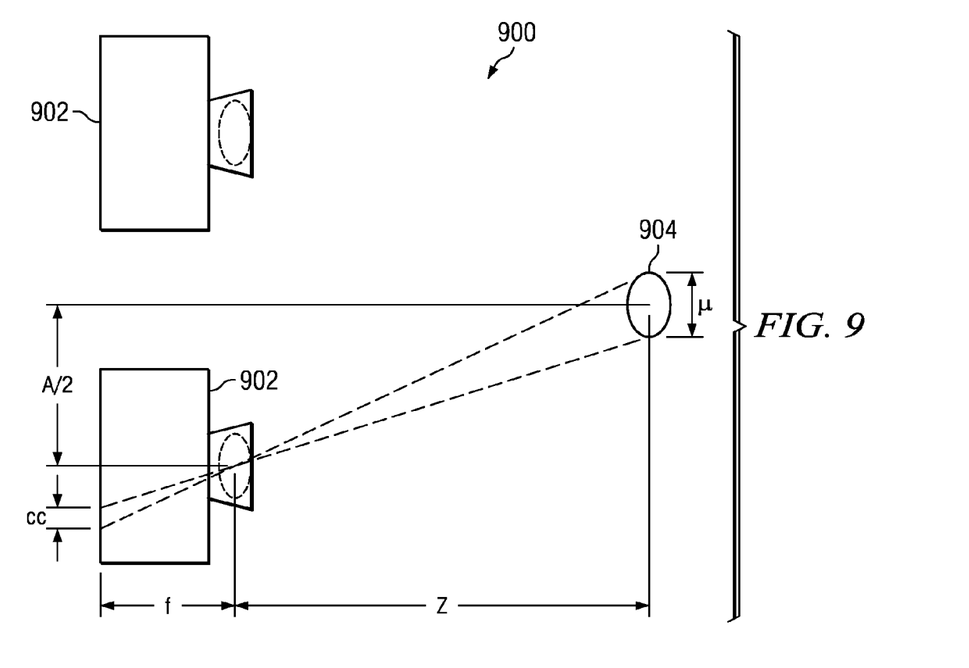
FIG. 9 is a schematic diagram illustrating the size of an object on a camera sensor, in accordance with the present disclosure.

FIG. 9 is a schematic diagram illustrating capture geometry 900. When captured by a camera 902, an object 904 with a size μ has a size cc at the charge-coupled device (CCD) sensor. The camera 902 has a focal length f and the depth of the object is Z. The size cc is dependent on the capture geometry 900 where:

$$cc = \frac{f}{z}\mu. \quad \text{(Equation 11)}$$

Figure 10:
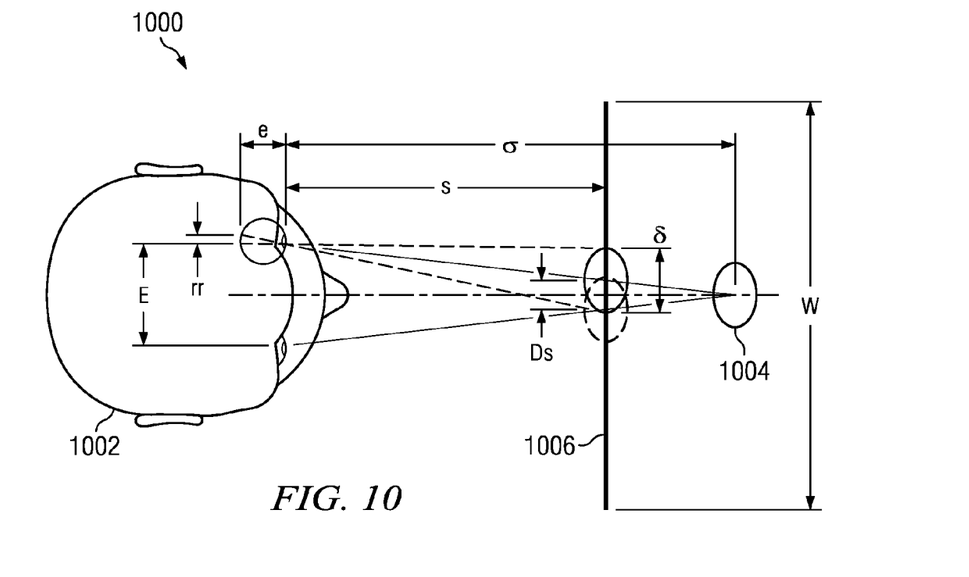
FIG. 10 is a schematic diagram illustrating the viewing geometry of an the size of object from a captured image on a retina, in accordance with the present disclosure.

FIG. 10 is a schematic diagram 1000 of a top-down view illustrating a viewer 1002 viewing an object 1004 on a stereoscopic display system with a display 1006. The size of the object 1004 on the retina is rr and the eye separation is E. The depth of the screen is s and the perceived depth of the object 1004 is σ. The separation between the left eye view and the right eye view is given by Ds. The actual size of the object 1004 at the display 1006 is δ, yielding the following geometrical relationship:

$$rr = \frac{e}{s}\delta \quad \text{(Equation 12)}$$

where screen scaling implies:

$$\delta = \frac{W}{c}cc. \quad \text{(Equation 13)}$$

Combining Equations 10-13, the size on the retina rr of a captured object in terms of its actual distance Z is an inversely proportional relationship:

$$rr = \left(\frac{e \cdot W \cdot f \cdot \mu}{s \cdot c}\right) \cdot \frac{1}{Z}. \quad \text{(Equation 14)}$$

Therefore, to look correct, it is preferred that the size on the retina rr be inversely proportional to the perceived depth or, $$rr \propto \frac{1}{\sigma} \quad \text{(Equation 15)}$$

which implies that scaled-depth condition can be written mathematically as:

$$\sigma \propto Z \quad \text{(Equation 16).}$$

To implement the desired scaled-depth proportion yielded by the analysis above, the perceived depth σ expression of Equation 5 is substituted into the perceived depth σ expression above:

$$\frac{s \cdot E \cdot Z}{(E-D) \cdot Z + \frac{W \cdot A}{2\tan\theta}} \propto Z. \quad \text{(Equation 17)}$$

For the left side of Equation 17 to be proportional to Z, then D=E, eliminating the (E−D)·Z term in the denominator. Then, substituting D for E in Equation 9 yields:

$$Ds_{min} = \frac{Z_{max} \cdot Ds_{max} - (Z_{max} - Z_{min}) \cdot E}{Z_{min}} \quad \text{(Equation 18)}$$

which is a direct relationship between the disparity limits $Ds_{min}$ and $Ds_{max}$ and, thus, the scaled-depth condition removes the independence between desired disparity limits $Ds_{min}$ and $Ds_{max}$, i.e., when implementing the scaled-depth condition (or achieving perceived depth σ directly proportional to the actual depth Z), $Ds_{min}$ is set once $Ds_{max}$ is set (and vice versa). For a given display, if the values of $Ds_{min}$ and $Ds_{max}$ substantially satisfy Equation 18, then these values may be used. For some displays, however, the values of $Ds_{min}$ and $Ds_{max}$ may not satisfy Equation 18 (or may not be close to satisfying Equation 18). If Equation 18 is not satisfied, then $Ds_{min}$ is either too small or too large. If $Ds_{min}$ is too large for Equation 18, then the scene captured by cameras may not use as much depth as the display would allow, i.e. in the case of scaled-depth with a "too large" $Ds_{min}$, a viewer will view the scene comfortably because perceived depth is directly proportional to actual depth; however, the entire depth range of the display is not maximized. Alternatively, if $Ds_{min}$ is "too small" for Equation 18 to be satisfied, then the image may not be viewed comfortably, i.e. the case of scaled-depth with a "too small" $Ds_{min}$ is not preferred for comfortable viewing. In summary, in a preferred embodiment, disparities within the limits can have scaled-depth mapping when:

$$Ds_{min} \geq \frac{Z_{max} \cdot Ds_{max} - (Z_{max} - Z_{min}) \cdot E}{Z_{min}}. \quad \text{(Equation 19)}$$

In this case, the condition in Equation 18 may be upheld by choosing the scene disparity limits to fit within the limits of a display. In a case where one of the display disparity limits is chosen to match one of the scene limits, scaled-depth is obtained with a fixed stereoscopic capture camera separation of either:

$$A = \frac{2 \cdot Z_{max} \cdot \tan\theta \cdot (E - Ds_{max})}{W} \quad \text{(Equation 20)}$$

when the furthest point in the scene is viewed at the furthest distance allowed for comfortable viewing, or:

$$A = \frac{2 \cdot Z_{min} \cdot \tan\theta \cdot (E - Ds_{min})}{W} \quad \text{(Equation 21)}$$

when the closest point in the scene is viewed at the closest distance allowed for comfortable viewing. Alternatively, the camera separation A can be an arbitrary distance somewhere in the range between the values given for A in Equations 20 and 21.

Linear Mapping

The non-linear relation of Equation 5 may be made linear if the camera separation is depth dependent. Linear mapping includes direct proportionality used for scaled-depth, but allows solutions where the condition of Equation 19 is not upheld. In these non scaled-depth cases, the relative spacing of objects is maintained, but does not strictly correspond to object relative sizes. Depth dependent camera spacing is a feasible option particularly within a computer graphical environment.

Mathematically, for generalized linear mapping, a depth dependent camera separation A(Z) that reduces the relation of Equation 5 to a general linear form is preferred, or:

$$\sigma = \frac{s \cdot E \cdot Z}{\left(E \cdot Z - D \cdot Z + \frac{W \cdot A(Z)}{2 \cdot \tan\theta}\right)} = \alpha \cdot Z + \beta \quad \text{(Equation 22)}$$

where α and β are independent of Z.

A function form for A(Z) would thus be:

$$A(Z) = \frac{2 \cdot \tan\theta}{W} \cdot (D - E) \cdot Z + \frac{2 \cdot \tan\theta \cdot s \cdot E \cdot Z}{W \cdot (\alpha \cdot Z + \beta)}. \quad \text{(Equation 23)}$$

To determine α and β the disparity limits can be used as they represent 'boundary conditions'. From the disparity limits $Ds_{max}$ and $Ds_{min}$ we can determine the perceived depth limits $\sigma_{max}$ and $\sigma_{min}$ using Equation 3 and applying them to the linear depth relationship of Equation 22 to get:

$$\alpha = \frac{\sigma_{max} - \sigma_{min}}{Z_{max} - Z_{min}} \quad \text{(Equation 24)}$$
$$= \frac{(Ds_{max} - Ds_{min}) \cdot E \cdot s}{(Ds_{max} - E) \cdot (Ds_{min} - E) \cdot (Z_{max} - Z_{min})}$$

and $$\beta = \sigma_{max} - \alpha \cdot Z_{max} = \frac{E \cdot s}{E - Ds_{max}} - \alpha \cdot Z_{max}. \quad \text{(Equation 25)}$$

In an embodiment, the camera separation is determined by Equations 23, 24, and 25 to take photographs of a scene at a distance Z. In another embodiment, the Equations 23-25 are implemented using CGI.

Figure 11:
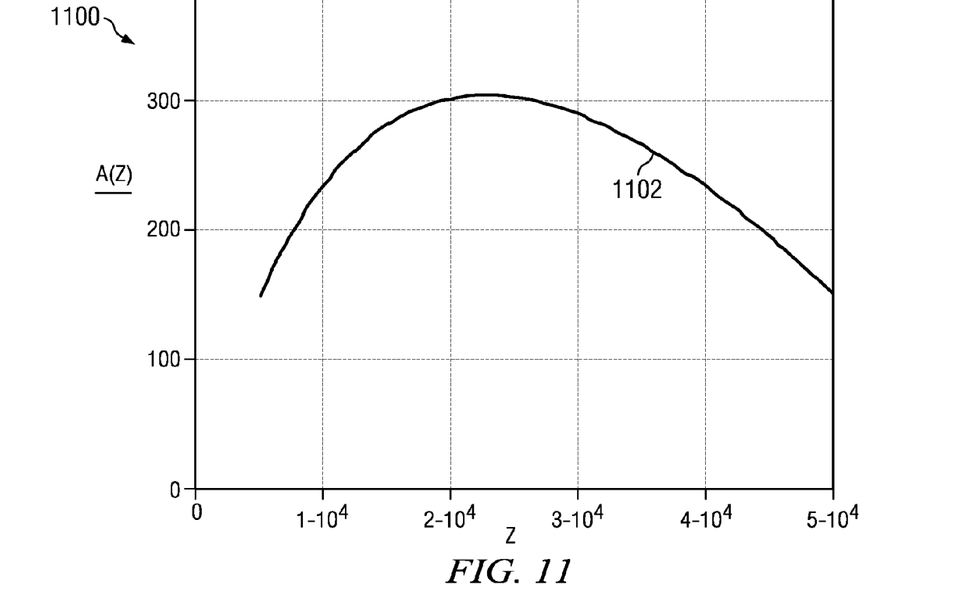
FIG. 11 is a graph illustrating a depth dependent camera spacing profile, in accordance with the present disclosure.

FIG. 11 is a graph 1100 illustrating depth dependent camera spacing profile 1102 for the numerical example of FIG. 7, where α≈0.0486 and β≈1287. Substituting these values into Equation 19 gives the separation profile 1102.

Figure 12:
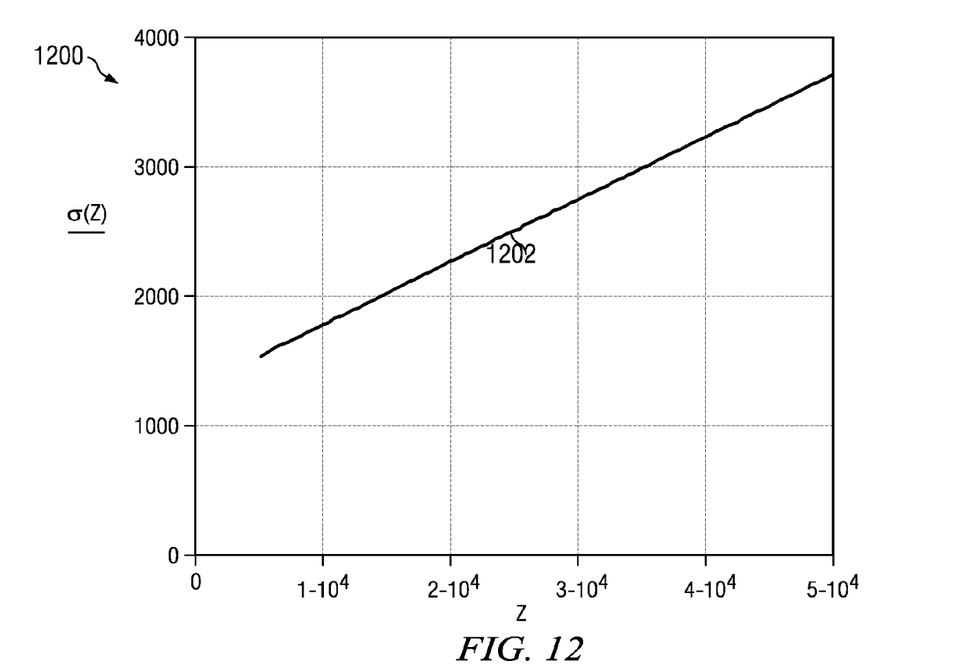
FIG. 12 is a graph illustrating scaled linear-depth mapping, in accordance with the present disclosure.

FIG. 12 is a graph 1200 illustrating a profile 1202 for corrected linear depth mapping. Back substituting the depth dependent separation A(Z) 1102 from FIG. 11 into Equation 22 yields the corrected linear depth mapping profile 1202 shown in FIG. 12.

Practical Implementations

Figure 13:
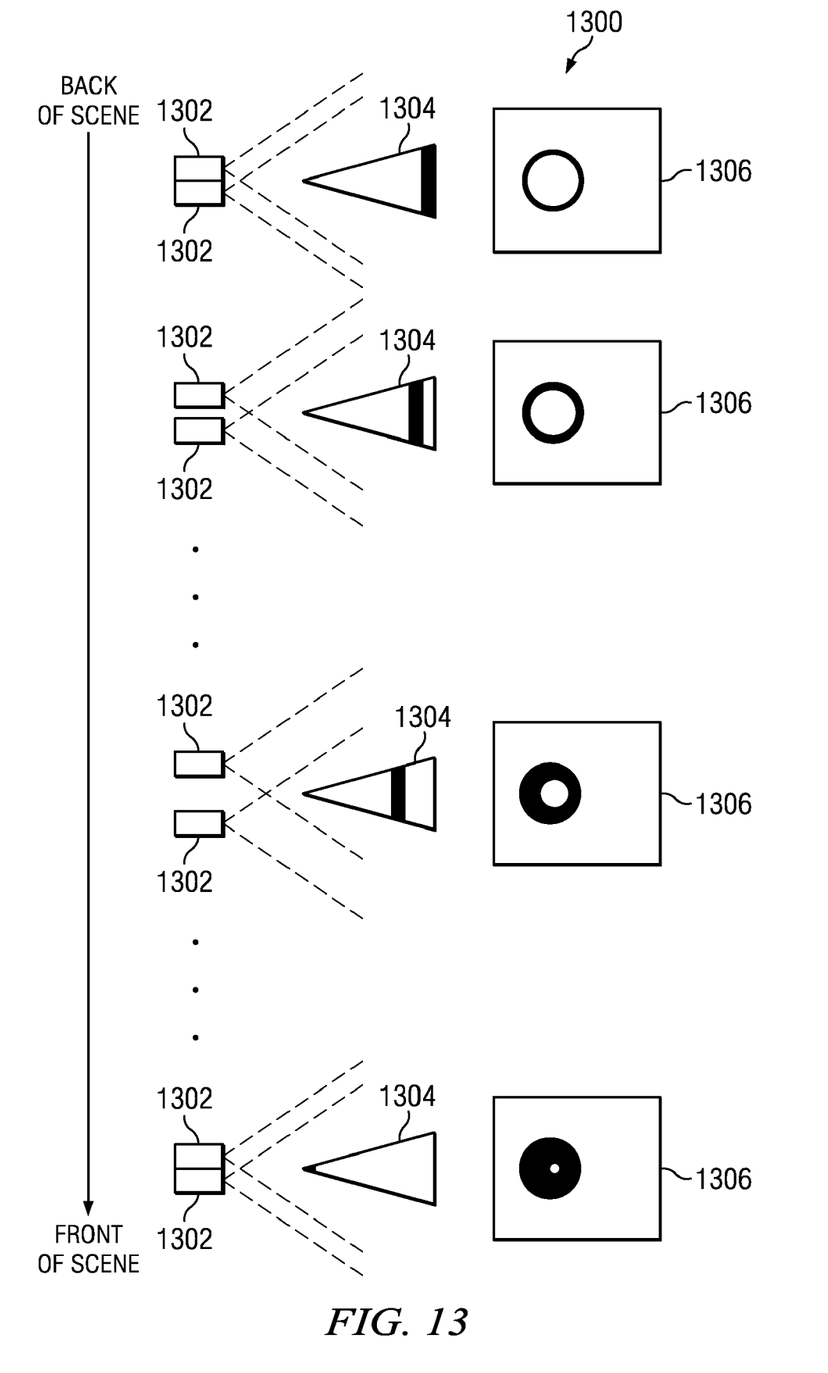
FIG. 13 is a schematic diagram illustrating a computer graphical rendering scenario for linear-depth mapping, in accordance with the present disclosure.

FIG. 13 is a schematic diagram 1300 of a computer graphical rendering scenario for linear depth mapping. Cameras 1302 capture images 1306 (left eye images 1306 shown for illustration purposes only) of cones 1304 facing the cameras 1302. The left eye images 1306 for each of the cones 1304 are different depending on the depth of the cone in the scene, i.e., in the case of CG, scenes can be rendered with varying camera positions dependent on the depth of an object.

For live capture one solution is to alter the disparity within the captured left and right eye images. Assuming a scene is captured with a camera set up with fixed separation of 40 mm (consistent with the depth budget of the numerical example), then the actual disparity Ds of any one pixel may be adjusted to provide a desired disparity $Ds_n$ for that pixel to correct for non-liner mapping. Pixels may be moved, which can cause gaps to appear. Fortunately, suitable back filling operations are already used when mapping 2D+depth encoded 3D into multi-view images, see, e.g., Berretty, R-P. M. et al., *Real Time Rendering for Multiview Autostereoscopic Displays*, Proc. of SPIE and IS&T Electronic Imaging, SPIE Vol. 6055, 6055N (2006).

The disparity transformation should provide linear depth perception consistent with Equation 17, where:

$$\sigma_n = \alpha \cdot Z + \beta \quad \text{(Equation 26)}$$

which would correspond to a desired $Ds_n$ in accordance with Equation 3, where:

$$\sigma_n = \frac{E \cdot s}{(E - Ds_n)}. \quad \text{(Equation 27)}$$

with the actual disparity Ds as captured related to depth Z through Equation 1, Equation 2, and Equation 4 where:

$$Ds = D - \frac{A \cdot W}{2 \cdot Z \cdot \tan\theta}. \quad \text{(Equation 28)}$$

Eliminating $\sigma_n$ and Z from these three equations and rearranging yields the following disparity adjustment relation:

$$\Delta D(Ds) = Ds - Ds_n \quad \text{(Equation 29)}$$

$$= Ds - \frac{\begin{pmatrix} 2 \cdot Ds \cdot \tan\theta \cdot s - 2 \cdot Ds \cdot \\ \tan\theta \cdot \beta - 2 \cdot D \cdot \tan\theta \cdot \\ s + 2 \cdot D \cdot \tan\theta \cdot \beta + A \cdot W \cdot \alpha \end{pmatrix} \cdot E}{\begin{pmatrix} 2 \cdot D \cdot \tan\theta \cdot \beta + A \cdot W \cdot \\ \alpha - 2 \cdot Ds \cdot \tan\theta \cdot \beta \end{pmatrix}}.$$

Figure 14:
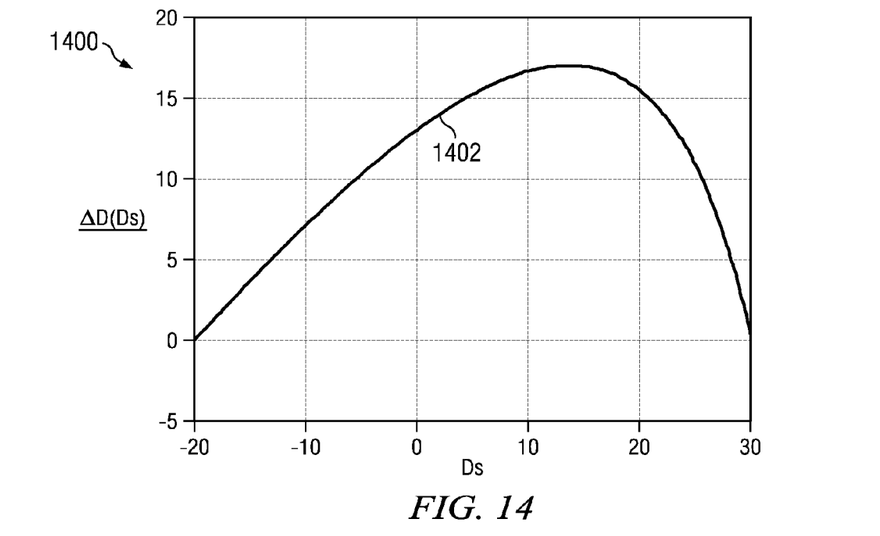
FIG. 14 is a graph illustrating the disparity adjustment, in accordance with the present disclosure.

FIG. 14 is a graph 1400 illustrating the disparity adjustment in mm for a 5 m-50 m scene captured with θ=15° cameras separated by 150 mm and replayed on a 1 m wide screen viewed at 2 m with −20 and 30 mm disparity limits. Using the system parameters of the numerical example, the disparity adjustment 1402 may be plotted as shown in FIG. 14 and represents a mapping solution to live capture.

Description of Specific Embodiments

In an embodiment, an algorithm that runs real time for CG simulation purposes, the most common example being a computer game, is disclosed.

CG simulation involves the rendering of 2D views from a 3D model based on a viewing position and angle. The 3D model consists of primitives in the form of polygons that are combined to form surfaces in space. Graphics cards (supplied by Nvidia, ATA etc.) are then employed to calculate a view of the 2D model from a viewing or camera position using ray tracing and other means. In this manner, a single 3D model can near instantly provide any view that is required. The very nature of this method enables real time stereoscopic content generation, since views from two camera positions can be easily rendered; one for each eye. Furthermore the rendering of a view is generally done in a layered format to avoid calculation of object obscuration. Changing the viewing or camera position as a function of depth is therefore feasible with minimal extra processing overhead.

Figure 15:
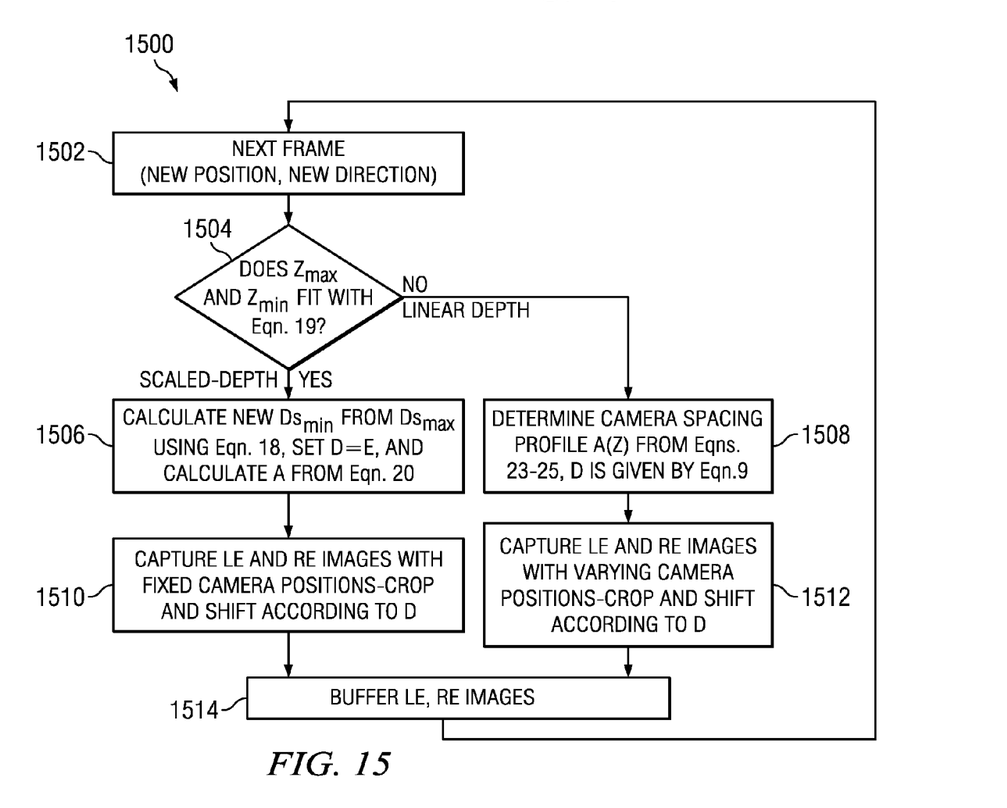
FIG. 15 is a schematic diagram illustrating an embodiment of an algorithm for depth mapping, in accordance with the present disclosure.

FIG. 15 is a schematic diagram illustrating a flow chart or algorithm 1500 of an embodiment in which the camera spacing A and fixed disparity D are adjusted. A frame (position, direction) is determined in step 1502. If Zmax and Zmin fit within Equation 19 at step 1504, then a scaled-depth approach is used (starting with step 1506). If not, then a linear depth approach is used (starting with step 1508). The depth dependent stereoscopic camera spacing for a 3D modeled scene according to the mathematical prescription is given by Equation 23-25 assuming the condition of Equation 19 does not hold (step 1508). Then left and right eye images are rendered with varying camera positions at step 1512. In the event that the condition of Equation 19 is upheld, then the limiting disparity $Ds_{max}$ (into the screen) is used to calculate a new minimum disparity $Ds_{min}$ using Equation 18 at step 1506. Equation 20 is then used to determine the fixed camera spacing A (also at step 1506) before rendering the left and right eye images from the two camera positions (step 1510). In either case, in an embodiment, the left eye and right eye images are buffered at step 1514. Then the next frame is determined at step 1502.

Both the fixed and variable camera position options provide rendered images that should be cropped and shifted according to the fixed disparity D at steps 1510 and 1512. Generally, this constitutes minor scaling of the images which is easily accommodated by the graphic card hardware. For more exact scaling, it might be preferred to capture a larger number of pixels in the horizontal plane with a corresponding slight increase in camera capture angle so that cropping by itself can provide the disparity shift without rescaling. Either option can be considered part of this embodiment.

Another embodiment includes a different choice of fixing the disparity limits in the scaled-depth branch of the algorithm. Specifically, if the condition of Equation 19 holds, then instead of taking the maximum disparity limit $Ds_{max}$ and backing off on the minimum limit $Ds_{min}$, it is possible to fix the minimum limit and adjust the maximum. This would provide that the closest object exists at the closest allowable position to the viewer. In general, a compromise between the limits could be made in this more flexible embodiment.

Figure 16:
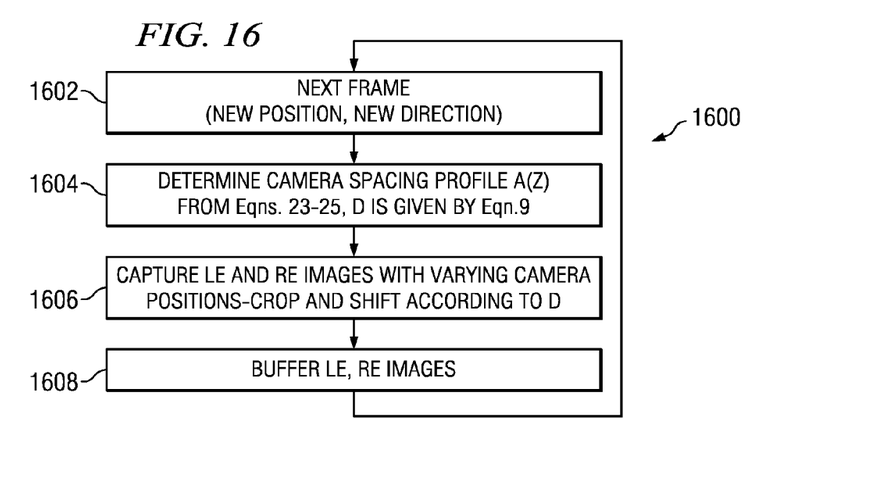
FIG. 16 is a schematic diagram illustrating an embodiment of another algorithm for depth mapping, in accordance with the present disclosure.

FIG. 16 is a schematic diagram illustrating a flow chart 1600 for another embodiment of depth mapping. A frame (position and direction) is determined at step 1602. Next, the camera spacing profile A(Z) is determined from Equations 20-22 and D is determined using Equation 9 (step 1604). Next, in step 1606, left- and right-eye images are captured with varying camera positions and the images are cropped and shifted by D. In an embodiment, the left- and right-eye images are buffered at step 1608.

Content may be rendered using the linear mapping regardless of the scaled-depth option. For a case in which scene depth complies with Equation 18, a fixed camera, scaled-depth solution may be substantially automatically derived, but in all other cases linear mapping may be implemented. The effect here would be to increase perceived depth beyond scaled-mapping for very flat scenes. This scenario could provide more depth information than the original scene.

Another embodiment includes toning down the linear mapping due to size conflict. Without scaled-depth mapping there is a conflict between the size of objects and their perceived depth. Linear mapping as proposed preserves relative depths but highlights the size-depth conflict more than a toned-down mapping. Such a mapping can be contrived using the convenient constant fixed disparity D framework derived for linear mapping. Introducing a variable parameter γ, a trade-off algorithm can be derived of the form:

$$A'(Z) = A(Z_{min}) + \gamma \cdot (A(Z) - A(Z_{min})) \quad \text{(Equation 30)}$$

where A(Z) is the varying linear mapping spacing given by Equation 23.

Figure 17:
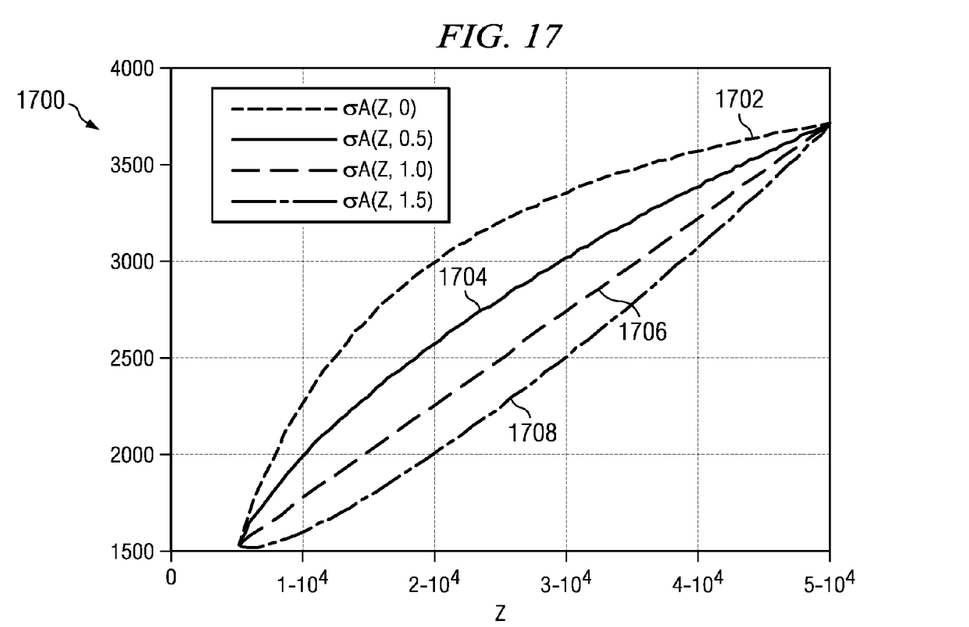
FIG. 17 is graph illustrating adjustable non-linear depth mapping, in accordance with the present disclosure.

FIG. 17 is a graph 1700 illustrating the effect of the variable γ on depth mapping, i.e. adjustable non-linear depth mapping. The four curves from top to bottom represent γ=0 (fixed cameras) 1702, γ=0.5 (compromised size-depth conflict) 1704, γ=1.0 (linear mapping) 1706, and γ=1.5 (out-of-plane smooth clipping) 1708. A value of 0 (1702) reproduces the fixed camera spacing scenario, whereas a value of 1.0 (1706)

yields linear mapping. In some embodiments, a value γ=0.5 (1704) offers a good compromised condition. Also shown in FIG. 17 is a γ>1.0 (1708) condition (specifically 1.5) where objects' minimum disparities are smoothly clipped. This embodiment might be suitable, for example, in scenes containing objects that fly quickly toward the viewer.

Another embodiment includes using functional forms other than linear mapping in accordance with depth-size conflict cost functions. One example would be choosing the depth to have a general polynomial dependency, where:

$$\sigma'(Z) = a_0 + a_1 \cdot Z + a_2 \cdot Z^2 + \quad \text{(Equation 31)}$$

and choose values of the coefficients in accordance with limiting disparity values and certain cost functions. One such cost function could be to minimize the difference between the final depth mapping gradient and the desired directly proportional relation. This can be written:

$$C = \int_{Z_{min}}^{Z_{max}} \left( \frac{\partial \sigma'}{\partial Z} - \frac{\sigma'}{Z} \right) \partial Z. \quad \text{(Equation 32)}$$

Solutions of this kind are more complex and are likely to track closely the various depth-mappings given by the exemplary embodiment disclosed above. This more general approach would however still be consistent with the principles described in herein, which includes a constant fixed disparity, variable camera mapping solution.

Another embodiment comprises implementing the above described algorithms in a live-capture scenario. One method includes capturing different depths with different camera separations through so called 'green screen' methods. However, a more preferred solution would be to use multiple cameras (or indeed any means of collecting multiple images at varying viewing angles) where regions captured by different cameras are stitched together dependent on the scene depth in accordance with the above described mapping algorithms. Scene depth can be ascertained through disparity detection between cameras or by an unrelated means such as depth cameras.

Another embodiment includes correcting stereo content using the approach summarized in FIG. 14. Here, disparity between stereo images is corrected after the fact as a function of position within the image. Correction to linear mapping is described by Equation 28 mathematically, but a similar approach can be derived for scaled-depth mapping.

Figure 18:
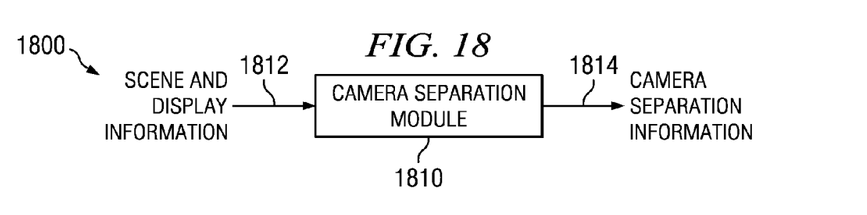
FIG. 18 is a schematic diagram of an apparatus for stereoscopic depth mapping, in accordance with the present disclosure.

FIG. 18 is a schematic diagram of a camera separation apparatus 1800. In one embodiment, the camera separation module 1810 comprises a controller operable to receive and analyze scene and display information 1812 and provide camera separation information 1814. The controller of the camera separation module 1810 may be any suitable logical device known in the art, and may be embodied in hardware, software, or a combination. The camera separation module 1810 may also be stored on a computer readable medium, as instructions for a machine.

Depending on the desired performance of the camera separation module 1810, the camera module may further comprise a store for temporary storage of the scene and display information 1812 and the camera separation information 1814. It is to be appreciated that the camera separation module 1810 can be adapted to work with any of the embodiments described in the present disclosure to provide the additional functionality of providing the camera separation information 1814. It is to be further appreciated that incorporating the camera separation module 1810 into selected embodiments of the present disclosure may involve modifying the camera separation module 1810 or the elements of the selected embodiments in accordance with the principles disclosed herein. For example, incorporating the camera separation module 1810 may involve adding an adapter operable to allow communication between the camera separation module 1810 and another electrical element.

While various embodiments in accordance with the principles disclosed herein have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method for positioning first and second cameras for capturing a stereoscopic image of a scene comprising a left image and a right image, the first and second cameras being spaced apart by a camera separation distance, the method comprising:
    determining a minimum separation between the left image and the right image for a nearest object in the stereoscopic image;
    determining a maximum separation between the left image and the right image for a most distant object in the stereoscopic image; and
    calculating the camera separation distance based on the minimum separation of the nearest object and the maximum separation of the most distant object;
    wherein calculating the camera separation distance comprises using an equation in which:

$$A = \frac{2 \cdot \tan\theta \cdot Z_{max} \cdot Z_{min} \cdot (Ds_{max} - Ds_{min})}{W \cdot (Z_{max} - Z_{min})}.$$

2. The method of claim 1, further comprising:
    calculating a fixed disparity based on the minimum separation and the maximum separation.

3. The method of claim 2, wherein calculating the fixed disparity comprises using the equation:

$$D = \frac{(Z_{max} \cdot Ds_{max} - Z_{min} \cdot Ds_{min})}{(Z_{max} - Z_{min})}.$$

4. The method of claim 1, wherein the minimum separation and the maximum separation correspond to scaled-depth mapping.

5. The method of claim 4, wherein a perceived depth of the scene is directly proportional to an actual depth of the scene.

6. The method of claim 4, wherein a scaled-depth mapping condition is met, the scaled-depth mapping condition comprises:

$$Ds_{min} \geq \frac{Z_{max} \cdot Ds_{max} - (Z_{max} - Z_{min}) \cdot E}{Z_{min}}.$$

7. The method of claim 1, wherein calculating the camera separation distance comprises determining the camera separation distance as a function of depth of an object in the scene.

8. The method of claim 7 wherein determining the camera separation distance as a function of depth comprises determining the camera separation using a linear mapping equation.

9. The method of claim 8, wherein the linear mapping equation comprises:

$$A(Z) = \frac{2 \cdot \tan\theta}{W} \cdot (D - E) \cdot Z + \frac{2 \cdot \tan\theta \cdot s \cdot E \cdot Z}{W \cdot (\alpha \cdot Z + \beta)}.$$

10. A method for positioning cameras for capturing a stereoscopic image of a scene comprising a left image and a right image, the method comprising:
determining whether a scaled-depth mapping condition is met using an equation in which:

$$Ds_{min} \geq \frac{Z_{max} \cdot Ds_{max} - (Z_{max} - Z_{min}) \cdot E}{Z_{min}}; \text{ and}$$

applying the scaled-depth mapping, whereby throughout the scene, a perceived depth of the scene is set directly proportional to an actual depth of the scene.

11. The method of claim 10, further comprising determining a camera separation distance between the cameras.

12. A method for positioning first and second cameras for capturing a stereoscopic image of a scene comprising a left image and a right image, the first and second cameras being spaced apart by a camera separation distance, the method comprising:
determining the camera separation distance as a function of depth of an object in the scene using a linear mapping equation in which:

$$A(Z) = \frac{2 \cdot \tan\theta}{W} \cdot (D - E) \cdot Z + \frac{2 \cdot \tan\theta \cdot s \cdot E \cdot Z}{W \cdot (\alpha \cdot Z + \beta)}.$$

13. A method for positioning first and second cameras for capturing a stereoscopic image of a scene comprising a left image and a right image, the first and second cameras being spaced apart by a camera separation distance, the method comprising:
determining whether a scaled-depth mapping condition is met;
if the scaled-depth mapping condition is met, applying the scaled-depth mapping, whereby throughout the scene, a perceived depth of the scene is set directly proportional to an actual depth of the scene; and
if the scaled-depth mapping condition is not met, setting the camera separation distance as a function of depth of an object in the scene;
wherein determining whether the scaled-depth mapping condition is met comprises using an equation in which:

$$Ds_{min} \geq \frac{Z_{max} \cdot Ds_{max} - (Z_{max} - Z_{min}) \cdot E}{Z_{min}}.$$

14. The method of claim 13, wherein setting the camera separation distance as a function of depth comprises determining the camera separation using a linear mapping equation.

15. The method of claim 14, wherein the linear mapping equation comprises:

$$A(Z) = \frac{2 \cdot \tan\theta}{W} \cdot (D - E) \cdot Z + \frac{2 \cdot \tan\theta \cdot s \cdot E \cdot Z}{W \cdot (\alpha \cdot Z + \beta)}.$$

16. The method of claim 13, further comprising determining the camera separation distance if the scaled-depth mapping condition is met.

17. A method for providing a stereoscopic image of a scene comprising a left image and a right image, the left image having left image pixels and the right image having corresponding right image pixels, the method comprising:
determining a camera separation distance between a first and second camera position;
adjusting an actual disparity of pixels in a captured image pair to provide a desired disparity for the left image pixels and the right image pixels; and
determining the desired disparity using an equation in which:

$$\Delta D(Ds) = Ds - Ds_n$$
$$= Ds - \frac{(2 \cdot Ds \cdot \tan\theta \cdot s - 2 \cdot Ds \cdot \tan\theta \cdot \beta - 2 \cdot D \cdot \tan\theta \cdot s + 2 \cdot D \cdot \tan\theta \cdot \beta + A \cdot W \cdot \alpha) \cdot E}{(2 \cdot D \cdot \tan\theta \cdot \beta + A \cdot W \cdot \alpha - 2 \cdot Ds \cdot \tan\theta \cdot \beta)}.$$

18. The method of claim 17, wherein adjusting the actual disparity to provide the desired disparity comprises correcting for non-linear mapping.

19. The method of claim 17, wherein the actual disparity comprises an offset between a left and right eye image of the captured image pair.

20. The method of claim 17, wherein the desired disparity comprises an offset between the left image pixels and the right image pixels of the stereoscopic image of the scene.

21. The method of claim 17, further comprising back-filling the stereoscopic image of the scene.

22. A method for positioning first and second cameras for capturing one or more stereoscopic image frames, each stereoscopic image frame comprising a left image and a right image, and the first and second cameras being spaced apart by a camera separation distance, the method comprising:
  determining a current frame position and direction;
  calculating a camera spacing profile A(Z) for the current frame using an equation in which:

$$A(Z) = \frac{2 \cdot \tan\theta}{W} \cdot (D-E) \cdot Z + \frac{2 \cdot \tan\theta \cdot s \cdot E \cdot Z}{W \cdot (\alpha \cdot Z + \beta)};$$

calculating a fixed disparity D based on a desired disparity budget for the current frame;
  capturing left and right images for the current frame using varying camera positions based on the camera spacing profile; and
  cropping and shifting the left and right images for the current frame based on the fixed disparity D.

23. The method of claim 22, further comprising buffering the left and right images for the current frame.

24. The method of claim 23, further comprising repeating the determining, calculating, capturing, cropping and shifting, and buffering for a plurality of consecutive stereoscopic image frames.

25. The method of claim 22, wherein calculating the fixed disparity D comprises using the equation:

$$D = \frac{(Z_{max} \cdot Ds_{max} - Z_{min} \cdot Ds_{min})}{(Z_{max} - Z_{min})}.$$

26. A method for positioning first and second cameras for capturing a stereoscopic image of a scene comprising a left image and a right image, the first and second cameras being spaced apart by a camera separation distance, the method comprising:
  determining a minimum separation between the left image and the right image for a nearest object in the stereoscopic image;
  determining a maximum separation between the left image and the right image for a most distant object in the stereoscopic image;
  calculating the camera separation distance based on the minimum separation of the nearest object and the maximum separation of the most distant object; and
  calculating a fixed disparity based on the minimum separation and the maximum separation using an equation in which:

$$D = \frac{(Z_{max} \cdot Ds_{max} - Z_{min} \cdot Ds_{min})}{(Z_{max} - Z_{min})}.$$

27. The method of claim 26, wherein the minimum separation and the maximum separation correspond to scaled-depth mapping.

28. The method of claim 27, wherein a perceived depth of the scene is directly proportional to an actual depth of the scene.

29. A method for positioning first and second cameras for capturing a stereoscopic image of a scene comprising a left image and a right image, the first and second cameras being spaced apart by a camera separation distance, the method comprising:
  determining a minimum separation between the left image and the right image for a nearest object in the stereoscopic image;
  determining a maximum separation between the left image and the right image for a most distant object in the stereoscopic image; and
  calculating the camera separation distance based on the minimum separation of the nearest object and the maximum separation of the most distant object;
  wherein calculating the camera separation distance comprises determining the camera separation distance as a function of depth of an object in the scene using a linear mapping equation in which:

$$A(Z) = \frac{2 \cdot \tan\theta}{W} \cdot (D-E) \cdot Z + \frac{2 \cdot \tan\theta \cdot s \cdot E \cdot Z}{W \cdot (\alpha \cdot Z + \beta)}.$$

30. The method of claim 29, wherein the minimum separation and the maximum separation correspond to scaled-depth mapping.

31. The method of claim 30, wherein a perceived depth of the scene is directly proportional to an actual depth of the scene.

32. A method for positioning first and second cameras for capturing a stereoscopic image of a scene comprising a left image and a right image, the first and second cameras being spaced apart by a camera separation distance, the method comprising:
  determining whether a scaled-depth mapping condition is met;
  if the scaled-depth mapping condition is met, applying the scaled-depth mapping, whereby throughout the scene, a perceived depth of the scene is set directly proportional to an actual depth of the scene; and
  if the scaled-depth mapping condition is not met, setting the camera separation distance as a function of depth of an object in the scene;
  wherein setting the camera separation distance comprises determining the camera separation using a linear mapping equation in which:

$$A(Z) = \frac{2 \cdot \tan\theta}{W} \cdot (D-E) \cdot Z + \frac{2 \cdot \tan\theta \cdot s \cdot E \cdot Z}{W \cdot (\alpha \cdot Z + \beta)}.$$

33. The method of claim 32, further comprising determining the camera separation distance if the scaled-depth mapping condition is met.

34. A method for positioning first and second cameras for capturing one or more stereoscopic image frames, each stereoscopic image frame comprising a left image and a right image, and the first and second cameras being spaced apart by a camera separation distance, the method comprising:
  determining a current frame position and direction;
  calculating a camera spacing profile A(Z) for the current frame;
  calculating a fixed disparity D based on a desired disparity budget for the current frame using an equation in which:

$$D = \frac{(Z_{max} \cdot Ds_{max} - Z_{min} \cdot Ds_{min})}{(Z_{max} - Z_{min})};$$

capturing left and right images for the current frame using varying camera positions based on the camera spacing profile;
  cropping and shifting the left and right images for the current frame based on the fixed disparity D.

* * * * *